MICRO-PRINT ENLARGER AND VIEWER

Filed Nov. 28, 1956 2 Sheets-Sheet 1

Inventor:
Walter W. Gray
By Gary, Desmond & Parker Attys.

Feb. 18, 1958 W. W. GRAY 2,823,582

MICRO-PRINT ENLARGER AND VIEWER

Filed Nov. 28, 1956 2 Sheets-Sheet 2

Inventor:
Walter W. Gray
By Gary, Desmond & Parker
Attys.

2,823,582

MICRO-PRINT ENLARGER AND VIEWER

Walter W. Gray, Crozet, Va., assignor to Acme Visible Records, Inc., Crozet, Va., a corporation of Delaware Application November 28, 1956, Serial No. 624,810

5 Claims. (Cl. 88—24)

This invention relates to improvements in a device for viewing an enlarged image of data or indicia printed on a reference card or the like in micro size.

In the maintenance of extensive record data which must be periodically referred to, it is desirable that the file of record data be as small as possible and yet be maintained in such form as to be readily accessible and readable. To accomplish this end opaque cards have been proposed which on the front face contain the data to be referred to in micro form, the data being subdivided into units, and on the opposite face of the card index indicia is inscribed which may be of such size as to be readable without enlargement, each index character on the rear face of the card referring to a respective unit of the subdivided indicia on the front face of the card.

The present invention refers to a device with which such cards, as described hereinbefore, may be used and comprises means whereby the indices upon the rear face of the card may be identified in their normal size and when the desired index character is discerned the card may be subjected to intense light whereby, by means of a suitable optical system, the unit data associated with the selected index character may be enlarged to readable size.

One of the important features of the present invention resides in a device having a projection opening through which transmitted light of reduced intensity may facilitate the identification of a desired index character, and which by a slight movement of the card in front of the projection opening manipulates means whereby the light may be intensified and the data on the front face of the card may be brought into focus to project by reflected light and enlarge the data upon a viewing screen.

The objects and advantages of the present invention will be more apparent from the accompanying drawings and following detailed description.

Figure 1:
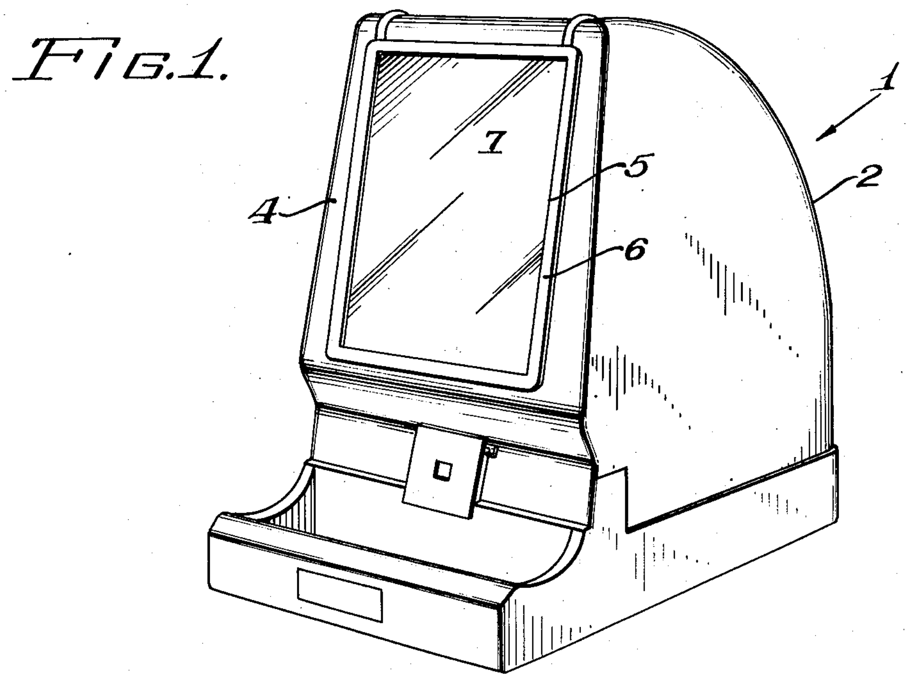
Fig. 1 is a perspective view of a device embodying the concepts of the present invention.

Referring in detail to the drawings, 1 indicates a viewing device embodying the concepts of the present invention, the device comprising a housing having a curved rear wall 2, a flat base 3 and a front 4. The front 4 is provided with an enlarged rectangular aperture 5, the defining edges of which comprise flanges 6 which function as a retaining seat for a ground glass or opal glass viewing screen 7.

Figure 2:
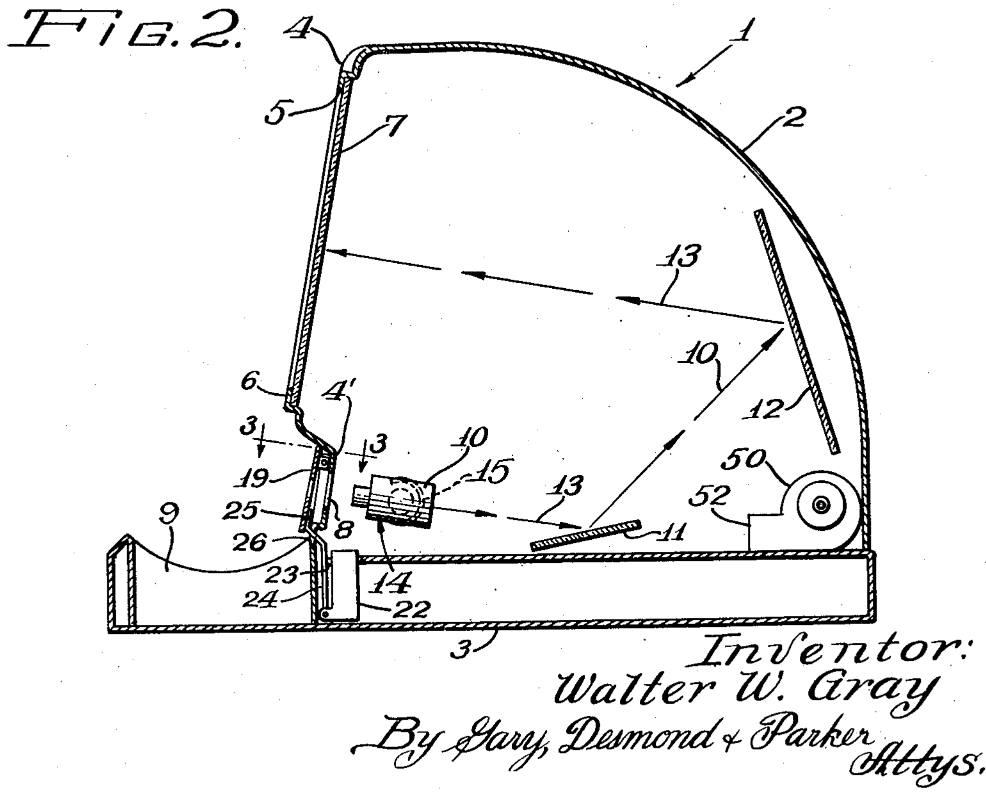
Fig. 2 is a vertical sectional view through the central portion of the device shown in Fig. 1.

Beneath the viewing screen 7, the front 4 recedes inwardly, as shown best at 4' in Figs. 2 and 4, and is provided centrally with a light aperture 8, the purpose of which will be hereinafter more fully described. The front portion of the device 1 comprises a receptacle 9 in which cards to be viewed may be stored during operation of the device.

Within the housing 2 adjacent the light aperture, a focusing lens is positioned within barrel 10, the optical axis of the lens being in alignment with the center of the aperture 8. A mirror 11 is spaced from the lens barrel 10 and is disposed adjacent the bottom of the housing. A second mirror 12 is positioned within housing 2 adjacent the rear portion thereof. The mirrors 11 and 12 are disposed at such angles with respect to the optical axis of the lens 10 as to have angles of incidence and reflection such as to reflect line of sight 13 from the lens to the mirrors 11 and 12 and to the central portion of screen 7, as shown best in Fig. 2.

On each side of the lens barrel 10 a separate light source 14, preferably an incandescent bulb, is positioned (only one of which is shown). Each light source 14 is provided with a reflector 15 which performs the dual function of concentrating the light from the light source in advance of the aperture 8 and block off direct light from the light source from mirrors 11 and 12.

Figure 3:
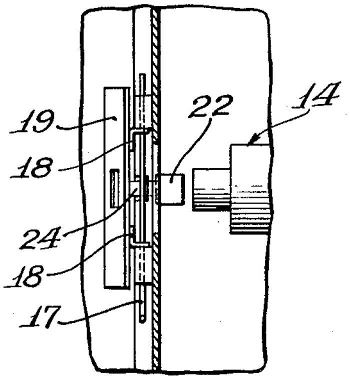
Fig. 3 is an enlarged detailed sectional view of the device taken on line 3—3 of Fig. 2.
Figure 4:
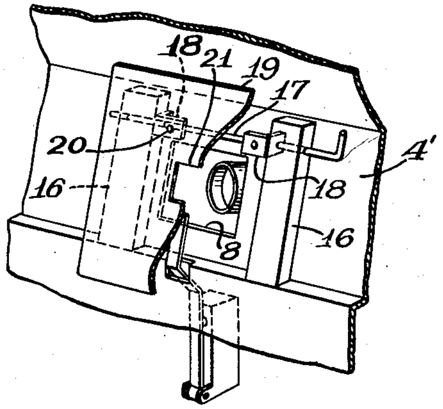
Fig. 4 is an enlarged detailed perspective view of the cardrest comprising a portion of the device.

Referring particularly to Figs. 3 and 4, the receding portion 4' of the front 4 carries a pair of spaced supports 16, a support being disposed on each side of aperture 8. A hinge pin 17 extends through the upper portion of each support 16 and a pair of angle members 18 are pivotally carried upon said hinge pin, one adjacent each support. A view plate 19 is carried by said angle members being secured thereto by rivets or the like 20, the arrangement being such that the plate is swingable with respect to said supports. The plate 19 is provided with an aperture 21 which is substantially centrally disposed with respect to aperture 8 in the receding portion 4' and is substantially centrally disposed with respect to the optical axis of the lens in barrel 10.

A micro-switch 22 is positioned within housing 2 and carries a spring biased button 23 which resiliently bears upon a hinged arm 24 pivoted to the body of the switch. The free end 25 of arm 24 extends through an opening 26 in the housing and resiliently bears upon the inner portion of plate 19. As will be hereinafter more fully described, the switch 22 is of the normally open type and the arm 24 normally urges plate 79 to a limited clockwise position, as viewed in Fig. 2, the clockwise movement of the plate being limited by contact of its upper edge with the housing wall. In the operation of the device, as will be hereinafter described, the plate 19 may be rocked in a counterclockwise direction, as viewed in Fig. 2, whereby the button 23 is depressed by arm 24 thereby closing switch 22.

Figures 5, 6, 7:
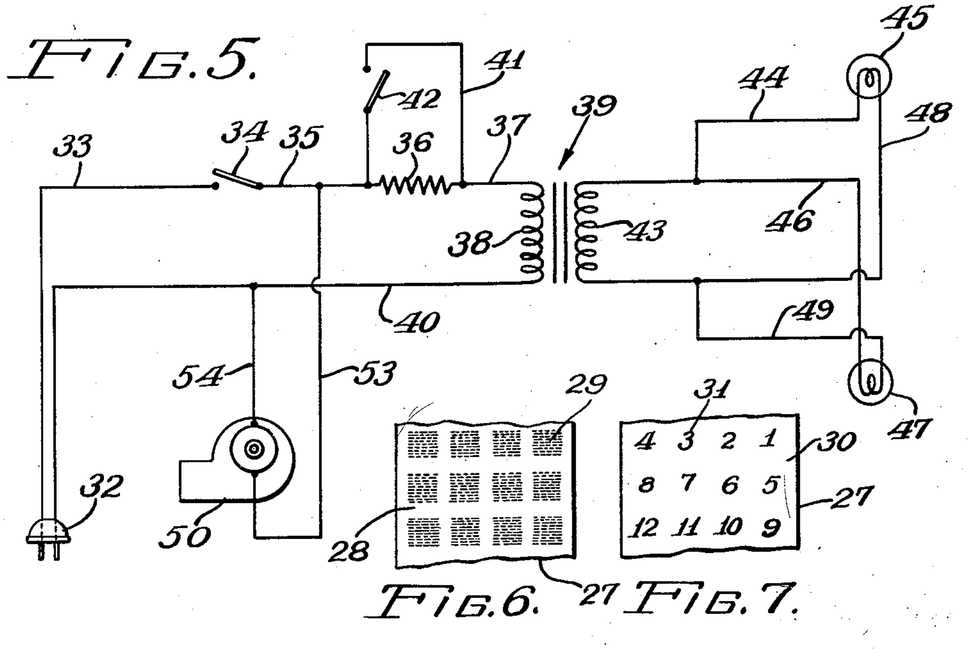
Fig. 5 is a schematic wiring diagram of the electrical circuit employed.
Fig. 6 is a front view of a card with which the present invention may be employed.
Fig. 7 is a rear view of the card shown in Fig. 6.

Referring particularly to Figs. 6 and 7 a data card 27 with which the present device may be employed, is shown. The card has a front face 28 upon which data or indicia 29 may be carried, said data being printed or otherwise inscribed in micro-form. It will be noted that the micro-indicia 29 is arranged in units upon the front face of the card. The card 27 also has a rear face 30 and printed or otherwise inscribed in numerals or letters which are of a size discernible by the naked eye are index indicia which correspond to the units 29 on the front face of the card.

Referring particularly to Fig. 5, a wiring diagram of the device 1 is shown. The electrical circuit is connected by means of a conventional plug 32 to a source of electric current (not shown). One side of the line is connected by means of conductor 33 to a control switch 34 the opposite side of said switch being connected by conductor 35 to a series resistance 36. The opposite side of the series resistance is connected by conductor 37 to one end of primary 38 of transformer 39, the opposite end of the primary being connected to the opposite side of the line by conductor 40.

A shunt 41 is connected across the resistance 36, said shunt being controlled by a switch 42, which corresponds to the micro-switch 22 hereinbefore described. Hence, when the micro-switch is open (its normal position) the current through primary 38 is reduced by the resistance 36. However, when the micro-switch is closed, as by rocking the plate 19 inwardly, the shunt 41 shunts the resistance 36 and the current through the primary 38 is increased.

One end of secondary 43 of transformer 39 is connected by conductor 44 to an electric lamp 45 and by conductor 46 to an identical lamp 47. The opposite sides of lamps 45 and 47 are connected by conductors 48 and 49, respectively, to the opposite end of secondary 43. The lamps 45 and 47 correspond to the light sources 14 hereinbefore described. The arrangement is such that with reduced current through the primary by the insertion of resistance 36, the lamps 45 and 47 glow at reduced intensity, but when full current passes through the primary, by shunting resistance 36, the lamps glow with high intensity.

In employing the present invention, cards 27 comprising the general classification or record may be carried in the container 9. When a desired unit 29 is to be referred to, an individual card 27 may be selected which is known to carry the desired indicia 29. This selection may be made by having the general classification broadly subclassified in any convenient or well known manner. When the desired card 27 is selected and with the control switch 34 closed and with lamps 45 and 47 at reduced intensity, the selected card is placed upon the face of plate 19 with the front 28 of the card facing the plate. The card may then be moved laterally until the desired reference numeral 31 appears plainly by the transmitted light which passes through apertures 8 and 21. The operator then knows that the desired unit 29 registers with aperture 21. The operator then forces the card and plate 19 inwardly to rock the plate counterclockwise, as viewed in Fig. 2. Switch 22 (switch 42) is then closed and resistance 36 is shunted permitting the passage of full current through the primary 38. The selected data 29 is then subjected to the full intensity of lamps 45 and 47. Simultaneously the movement of the plate 19 automatically places the selected data unit 29 at the focus of the lens 10 and by reflected light the image is cast in enlarged condition upon screen 7 where it is readable by the operator.

The lamps 45 and 47 when glowing at full intensity give off considerable heat. It will be noted, however, that during the preliminary selection of the data unit 29 the lamps are at low intensity and hence, the total period of time when high heat is produced is shortened. Moreover, the index indicia 31 is more readily observable under reduced intensity transmitted light than under high intensity transmitted light, although the latter is more desirable in enlarging and projecting the micro-images.

To assist in cooling the lights, a blower may be positioned in the housing 1 with its outlet 52 directed toward the zone of heat generation. The blower 50 may be electrically driven and may be connected by conductors 53 and 54 to conductors 35 and 40, respectively. Thus, when the control switch 34 is closed, the blower 50 operates continuously.

Many variations of the present invention may occur to those skilled in the art and, hence, I do not wish to be limited to the exact details shown and described except as necessitated by the appended claims.

I claim as my invention:

1. A micro-print record card enlarger and viewer which comprises, a housing, a translucent screen carried by said housing as one of the walls thereof, said housing being provided with an opening, enlarging lens means positioned in said housing having the optical axis thereof projecting through said opening, a light source disposed adjacent said enlarging lens means, reflecting means for said light source for directing light from said light source outwardly through said opening, a multi-voltage electric circuit connected to said light source, an electric switch connected in said circuit for selectively subjecting the light source to one of a plurality of voltages, a movable actuating arm carried by said switch disposed adjecent said opening, a card supporting plate for carrying a micro-print record card, said plate being mounted upon said housing in movable overlying relationship with respect to said opening, said plate being in contacting relationship with said switch arm, said plate being provided with an aperture registering with said opening in said housing whereby said plate with a micro-print record card carried thereon may be moved to move said switch arm to change the voltage in said circuit and change the intensity of the light projected through said opening onto the card carried by said card support, and light reflective means carried in said housing for reflecting the image of the micro-print from said enlarging lens means upon said screen.

2. A micro-print record card enlarger and viewer which comprises, a housing, a translucent screen carried by said housing as one of the walls thereof, said housing being provided with an opening, enlarging lens means positioned in said housing having the optical axis thereof projecting through said opening, a light source disposed adjacent said enlarging lens means, reflecting means for said light source for directing light from said light source through said opening, a multi-voltage electric circuit connected to said light source, an electric switch connected in said circuit for selectively subjecting the light source to one of a plurality of voltages, a movable actuating arm carried by said switch disposed adjacent said opening, a card supporting plate for carrying a micro-print record card hingedly mounted upon said housing in overlying relationship with respect to said opening, said plate being in contacting relation with said switch arm to actuate said switch arm when the plate hingedly moves, said plate being provided with an aperture registering with said opening in said housing whereby said plate with a micro-print record card carried thereon may be hingedly moved to move said switch arm to change the voltage in said circuit, and light reflective means carried in said housing for reflecting the image of the micro-print from said enlarging lens means upon said screen.

3. A micro-print record card enlarger and viewer which cmprises, a housing, a translucent screen carried by said housing as one of the walls thereof, said housing being provided with an opening, enlarging lens means positioned in said housing having the optical axis thereof projecting through said opening, a light source disposed adacent said enlarging lens means, reflecting means for directing light from said light source through said opening, a multi-voltage electric circuit connected to said light source, an electric switch connected in said circuit for selectively subjecting the light source to one of a plurality of voltages, a movable actuating arm carried by said switch disposed adjacent said opening, a card supporting plate carried by said housing in movable overlying relationship with respect to said opening, said plate being in contacting relationship with said switch arm, said plate being provided with an aperture registering with said opening in said housing whereby said plate with a micro-print record card carried thereon may be moved to move said switch arm to change the voltage in said circuit and bring the micro-print upon said card into the focus of said enlarging lens means, and light reflective means carried in said housing for reflecting the image of the micro-print from said enlarging lens means upon said screen.

4. A micro-print record card enlarger and viewer which comprises, a housing, a translucent screen carried by said housing as one of the walls thereof, said housing being provided with an opening beneath said screen, enlarging lens means positioned in said housing adacent said opening having the optical axis thereof projecting through said opening, a light source disposed adjacent said enlarging lens means, means in said housing for directing light from said light source through said opening, a multi-voltage electric circuit connected to said light source, an electric switch connected in said circuit for selectively subjecting the light source to one of a plurality of voltages, a movable actuating arm carried by said switch disposed adjacent said opening, a card supporting plate swingably mounted upon said housing in overlying relationship with respect to said opening, said plate being in contacting relationship with said switch arm to actuate said switch when said plate swings, said plate being provided with an aperture registering with said opening in said housing whereby said plate with a micro-print record card carried thereon may be swung to actuate said switch arm to change the voltage in said circuit, and light reflective means carried in said housing for reflecting the image of the micro-print upon said card from said enlarging lens means upon said screen.

5. A micro-print record card enlarger and viewer which comprises, a record card having micro-print data on one side and index data on the opposite side, a housing, a translucent screen carried by said housing as one of the walls thereof, said housing being provided with an opening, enlarging lens means positioned in said housing having the optical axis thereof projecting through said opening, a light source disposed adjacent said enlarging lens means, reflecting means for directing light from said light source through said opening, a dual-voltage electric circuit connected to said light source, an electric switch connected in said circuit for selectively subjecting the light source to one of said two voltages, a movable actuating arm carried by said switch disposed adjacent said opening, a card supporting plate carried by said housing in movable overlying relationship with respect to said opening for holding a record card with the micro-print facing the plate, said plate being in contacting relationship with said switch arm, said plate being provided with an aperture registering with said opening in said housing whereby a portion of said micro-print faces said opening, and whereby said light source energized at one voltage casts transmitted light through said card to illuminate said index data, said plate being movable to actuate said switch arm and subject the light source to said other voltage to reflect said micro-print through said enlarging lens means, and light reflective means carried in said housing for reflecting the image of the micro-print from said enlarging lens means upon said screen.

No references cited.